US009781329B2

(12) United States Patent
Ishii

(10) Patent No.: US 9,781,329 B2
(45) Date of Patent: Oct. 3, 2017

(54) IMAGE CAPTURE APPARATUS AND METHOD FOR CONTROLLING THE SAME

(71) Applicant: CANON KABUSHIKI KAISHA, Tokyo (JP)

(72) Inventor: Hirokazu Ishii, Chofu (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/850,673

(22) Filed: Sep. 10, 2015

(65) Prior Publication Data

US 2016/0080635 A1 Mar. 17, 2016

(30) Foreign Application Priority Data

Sep. 11, 2014 (JP) ................................. 2014-185703

(51) Int. Cl.
*H04N 5/232* (2006.01)
*H04N 5/369* (2011.01)
*H04N 5/235* (2006.01)

(52) U.S. Cl.
CPC ....... *H04N 5/23212* (2013.01); *H04N 5/3696* (2013.01)

(58) Field of Classification Search
CPC . H04N 5/23293; H04N 5/2351; H04N 5/3696
USPC ..... 348/345, 353; 396/79, 80, 104; 382/254, 382/255, 274, 172, 270
See application file for complete search history.

(56) References Cited

U.S. PATENT DOCUMENTS

| 7,471,330 | B2 * | 12/2008 | Okawara ............ | H04N 5/23212 |
| | | | | 348/348 |
| 8,405,760 | B2 * | 3/2013 | Yamasaki ................ | G03B 3/10 |
| | | | | 348/280 |
| 8,724,011 | B2 * | 5/2014 | Nakamoto ......... | H04N 5/23212 |
| | | | | 348/345 |
| 8,767,118 | B2 * | 7/2014 | Yamasaki ................ | G03B 3/10 |
| | | | | 348/349 |
| 9,531,944 | B2 * | 12/2016 | Hamano ............ | H04N 5/23212 |
| 9,591,205 | B2 * | 3/2017 | Kudo .................. | H04N 5/23212 |
| 2008/0258039 | A1 * | 10/2008 | Kusaka .................. | G02B 7/346 |
| | | | | 250/201.8 |
| 2010/0194967 | A1 * | 8/2010 | Amano .................... | G02B 7/34 |
| | | | | 348/345 |

(Continued)

FOREIGN PATENT DOCUMENTS

JP 2000-292686 A 10/2000
JP 2008-085738 A 4/2008

*Primary Examiner* — Tuan Ho
*Assistant Examiner* — Marly Camargo
(74) *Attorney, Agent, or Firm* — Cowan, Liebowitz & Latman, P.C.

(57) ABSTRACT

The accuracy of focus detection of a phase-difference detection type using a signal obtained from a focus detection pixel is improved. A defocus amount of an imaging optical system is computed based on an image signal obtained from an image sensor. Meanwhile, an evaluation value that is based on contrast information of the image signal is computed, and it is determined based on the evaluation value whether or not to consider a defocus amount computed in the past. If it is determined to consider the defocus amount computed in the past, a final defocus amount is computed based on a plurality of defocus amounts including the defocus amount computed in the past.

13 Claims, 13 Drawing Sheets

(56) References Cited

U.S. PATENT DOCUMENTS

| | | | |
|---|---|---|---|
| 2012/0242886 A1* | 9/2012 | Kawarada | G02B 7/365 348/345 |
| 2013/0113987 A1* | 5/2013 | Fukuda | G02B 7/28 348/349 |
| 2014/0300792 A1* | 10/2014 | Nakamura | H04N 5/23212 348/333.08 |
| 2014/0340567 A1* | 11/2014 | Fukuda | H04N 5/23212 348/353 |

* cited by examiner

PLAN VIEW

A-A CROSS-SECTIONAL VIEW

PLAN VIEW

A-A CROSS-SECTIONAL VIEW

PLAN VIEW

A-A CROSS-SECTIONAL VIEW

FIG. 8

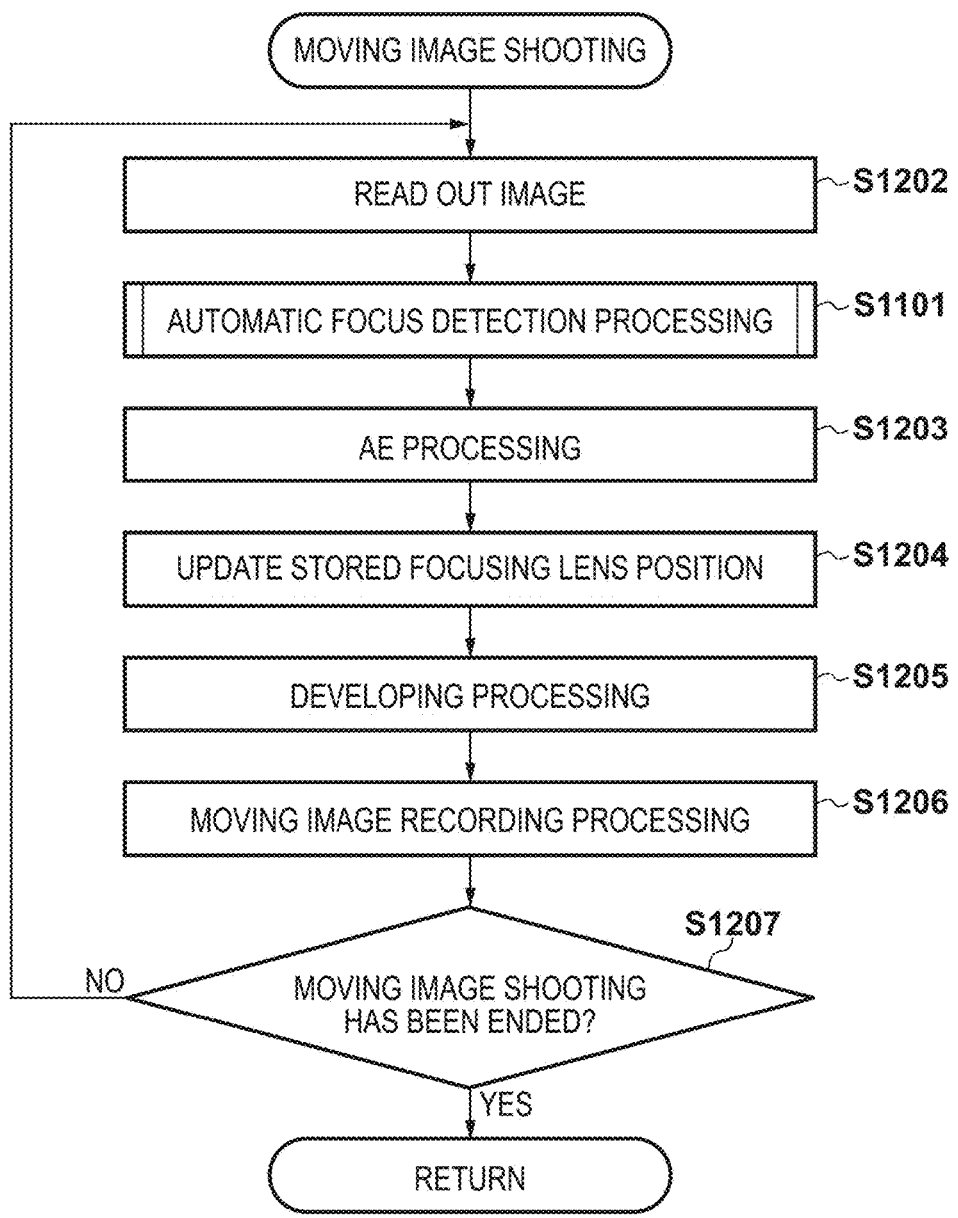

IMAGE CAPTURE APPARATUS AND METHOD FOR CONTROLLING THE SAME

BACKGROUND OF THE INVENTION

Field of the Invention

The present invention relates to image capture apparatuses and methods for controlling the image capture apparatuses, and relates in particular to an automatic focus detection technique.

Description of the Related Art

Provision of a specific function to a part of a pixel group arranged in an image sensor in order to achieve automatic focus detection (AF) of a phase-difference detection type using a signal obtained from the image sensor has been known. For example, Japanese Patent Laid-Open No. 2000-292686 discloses an image sensor in which focus detection pixels provided with a pupil division function by arranging a light receiving region while shifting this light receiving region with respect to an optical axis of an on-chip microlens are arranged at prescribed intervals within a pixel region. With this image sensor, focus detection of the phase difference detection type can be performed based on a pair of signals obtained from focus detection pixels having different pupil division directions.

Meanwhile, recent image capture apparatuses use a method appropriate for application of signals when reading out the signals from pixels in an image sensor. For example, when performing live-view display, since the resolution of a display apparatus is lower than the number of pixels in an image sensor, signals of an appropriate number of pixels for the display are obtained by reading out the pixels while adding signals of a plurality of pixels, or reading out the pixels while thinning them out. When recording a moving image as well, similarly, an image of a moving image resolution is acquired. When shooting and recording a moving image as in the case of live-view display, smoothness of the display is more important than the resolution unlike at the time of recording a still image, and therefore it is desirable to increase the frame rate.

However, if the frame rate is increased, the exposure time per frame becomes shorter. For this reason, it is difficult to maintain the accuracy of automatic focus detection using signals obtained from the focus detection pixels, particularly for a low-luminance object. With regard to this problem, Japanese Patent Laid-Open No. 2008-085738 has proposed a method in which signals obtained from the focus detection pixels are added for a plurality of frames, and focus detection is performed using the added signal.

The relationship between a defocus amount and positional difference (phase difference) between a pair of signals obtained from the focus detection pixels varies in accordance with shooting conditions such as the f-number. Accordingly, a coefficient to be used when converting the positional difference into the defocus amount needs to be a value suitable for the shooting conditions. However, with the configuration described in Japanese Patent Laid-Open No. 2008-085738 in which the positional difference between a pair of image signals obtained by addition is converted into the defocus amount, the conversion into the defocus amount will be performed with one coefficient even in the case where the shooting conditions change during a time period of adding the signals of the focus detection pixels. Accordingly, it is difficult to obtain an accurate defocus amount.

SUMMARY OF THE INVENTION

The present invention has been made in view of the foregoing problem in the conventional technique. The present invention provides an image capture apparatus with an increased accuracy of focus detection of the phase-difference detection type using signals obtained from focus detection pixels, and a method for controlling the image capture apparatus.

According to an aspect of the present invention, there is provided an image capture apparatus comprising: an image sensor capable of acquiring an image signal to be used in focus detection of a phase-difference detection type; a first computing unit configured to compute a defocus amount of an imaging optical system based on the image signal; a second computing unit configured to compute an evaluation value that is based on contrast information of the image signal; a determining unit configured to determine, based on the evaluation value, whether or not to consider a defocus amount computed in the past; and a third computing unit configured to compute a final defocus amount based on a plurality of defocus amounts including the defocus amount computed in the past if it is determined to consider the defocus amount computed in the past by the determining unit, and compute the final defocus amount based on a defocus amount that does not include the defocus amount computed in the past if it is determined not to consider the defocus amount computed in the past by the determining unit.

According to another aspect of the present invention, there is provided a method for controlling an image capture apparatus including an image sensor capable of acquiring an image signal to be used in focus detection of a phase-difference detection type, the method comprising: a first computing step of computing a defocus amount of an imaging optical system based on the image signal; a second computing step of computing an evaluation value that is based on contrast information of the image signal; a determining step of determining, based on the evaluation value, whether or not to consider a defocus amount computed in the past; and a third computing step of computing a final defocus amount based on a plurality of defocus amounts including the defocus amount computed in the past if it is determined to consider the defocus amount computed in the past in the determining step, and computing the final defocus amount based on a defocus amount that does not include the defocus amount computed in the past if it is determined not to consider the defocus amount computed in the past in the determining step.

According to a further aspect of the present invention, there is provided a non-transitory computer-readable storage medium storing a program for causing a computer provided in an image capture apparatus including an image sensor capable of acquiring an image signal to be used in focus detection of a phase-difference detection type to function as: a first computing unit configured to compute a defocus amount of an imaging optical system based on the image signal; a second computing unit configured to compute an evaluation value that is based on contrast information of the image signal; a determining unit configured to determine, based on the evaluation value, whether or not to consider a defocus amount computed in the past; and a third computing unit configured to compute a final defocus amount based on a plurality of defocus amounts including the defocus amount computed in the past if it is determined to consider the defocus amount computed in the past by the determining unit, and compute the final defocus amount based on a defocus amount that does not include the defocus amount computed in the past if it is determined not to consider the defocus amount computed in the past by the determining unit.

Further features of the present invention will become apparent from the following description of exemplary embodiments with reference to the attached drawings.

BRIEF DESCRIPTION OF THE DRAWINGS

FIG. 8 is a diagram showing exemplary arrangement of the image capture pixels and the focus detection pixels in the image sensor in an embodiment.

FIG. 12 is a flowchart showing the details of moving image shooting processing in an embodiment.

DESCRIPTION OF THE EMBODIMENTS

Exemplary embodiments of the present invention will now be described in detail in accordance with the accompanying drawings.

Figure 1:
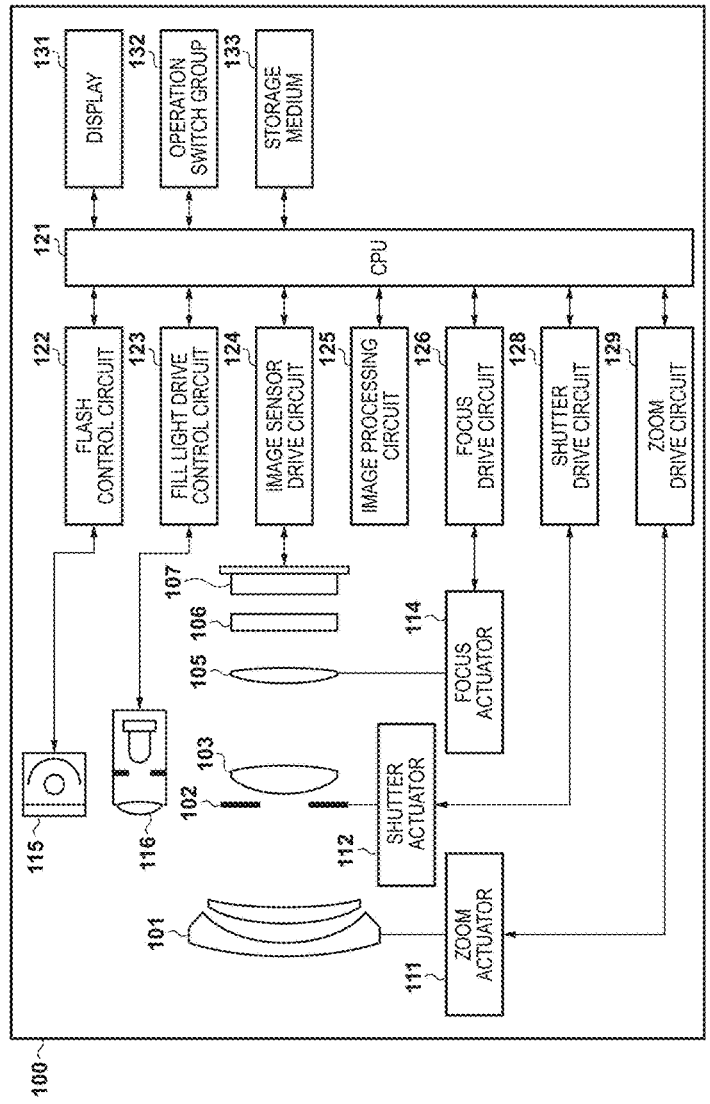
FIG. 1 is a diagram showing an exemplary functional configuration of a digital still camera, which serves an exemplary image capture apparatus according to an embodiment of the present invention.

FIG. 1 is a diagram showing an exemplary functional configuration of a digital still camera 100 (hereinafter referred to simply as a camera 100), which serves as an exemplary image capture apparatus according to an embodiment of the present invention.

A first lens group 101 is arranged at a leading end of an imaging optical system (image forming optical system), and is held so as to be able to move back and forth along the optical axis. A shutter 102 functions not only as a shutter for controlling exposure time when shooting a still image but also as a diaphragm for adjusting light quantity at the time of shooting by adjusting the opening diameter thereof. A second lens group 103 arranged on the back face (on the image sensor side) of the shutter 102 can move back and forth along the optical axis integrally with the shutter 102, and achieves a zoom function together with the first lens group 101.

A third lens group 105 is a focusing lens and can move back and forth along the optical axis. Hereinafter, the third lens group 105 will be called a focusing lens. The focus position of the imaging optical system is adjusted by the position of the focusing lens 105. Accordingly, information regarding the position of the focusing lens (e.g., a pulse counting position etc.) is information indicating a focusing state of the imaging optical system. The information regarding the position of the focusing lens 105 can be acquired through a focus drive circuit 126 by the CPU 121. An optical low pass filter 106 is arranged in front of an image sensor 107, and reduces pseudo color and moiré that are generated in a captured image. The image sensor 107 is constituted by a two-dimensional CMOS image sensor and peripheral circuits thereof. In this embodiment, the image sensor 107 is a two-dimensional single-panel color image sensor in which a plurality of light receiving elements, namely m light receiving elements and n light receiving elements are two-dimensionally arranged respectively in the lateral direction and the perpendicular direction, and primary color mosaic filters having a Bayer pattern are formed on-chip on the light receiving elements. The color filters restrict, in each pixel, wavelengths of transmitted light incident on the light receiving elements.

A zoom actuator 111 rotates a cam tube (not shown) to drive at least one of the first lens group 101 and the third lens group 105 along the optical axis in accordance with the control of a zoom drive circuit 129, and achieves a zoom (magnification change) function. A shutter actuator 112 controls the opening diameter of the shutter 102 to adjust the light quantity for image capturing, and controls the exposure time when capturing a still image, in accordance with the control of a shutter drive circuit 128.

A focus actuator 114 drives the third lens group 105 along the optical axis in accordance with the control of the focus drive circuit 126.

A flash 115 may be a flash illuminating device using a xenon flash tube, but may also be an illuminating device having an LED that continuously emits light. An AF fill light output unit 116 projects an image of a mask having a prescribed opening pattern onto an object field via a projection lens, and improves a focus detection capability for low-luminance objects and low-contrast objects.

The CPU 121 controls the overall operations of the camera 100, and has a calculation unit, a ROM, a RAM, an A/D converter, a D/A converter, a communication interface circuit, and the like, which are not shown in FIG. 1. The CPU 121 executes a program stored in a nonvolatile storage medium (e.g., a ROM), which is not shown in FIG. 1, controls various circuits that the camera 100 has, and achieves functions of the camera 100 such as AF, AE, image processing, and recording.

A flash control circuit 122 controls lighting of the flash 115 synchronously with an image capturing operation. A fill light drive control circuit 123 controls lighting of the AF fill light output unit 116 at the time of a focus detection operation. An image sensor drive circuit 124 controls operations of the image sensor 107, and also performs A/D conversion on an image signal read out from the image sensor 107 and outputs a resulting signal to the CPU 121. An image processing circuit 125 applies to an image signal, image processing such as γ conversion, color interpolation, and JPEG encoding.

The focus drive circuit 126 moves the focusing lens 105 along the optical axis by driving the focus actuator 114 in accordance with the control of the CPU 121, and performs focus adjustment. The shutter drive circuit 128 drives the shutter actuator 112 to control the opening diameter and opening/closing timing of the shutter 102. The zoom drive circuit 129 drives the zoom actuator 111 in accordance with a zoom operation that is input from an image capturing person by pressing a zoom operation switch included in an operation switch group 132, for example.

A display device 131 is an LCD or the like, and displays information regarding an image capture mode of the camera 100, a preview image before capturing an image, an image for check after capturing an image, information of a focusing state at the time of focus detection, and the like. The operation switch group 132 includes a power switch, a release (image capture trigger) switch, a zoom operation switch, an image capture mode selection switch, and the like. The operation switch group 132 also includes a focus switch for selecting whether to carry out automatic focus detection during live-view display in a standby state. A storage medium 133 is a detachable semiconductor memory card, for example, and records a captured image.

Figure 2:
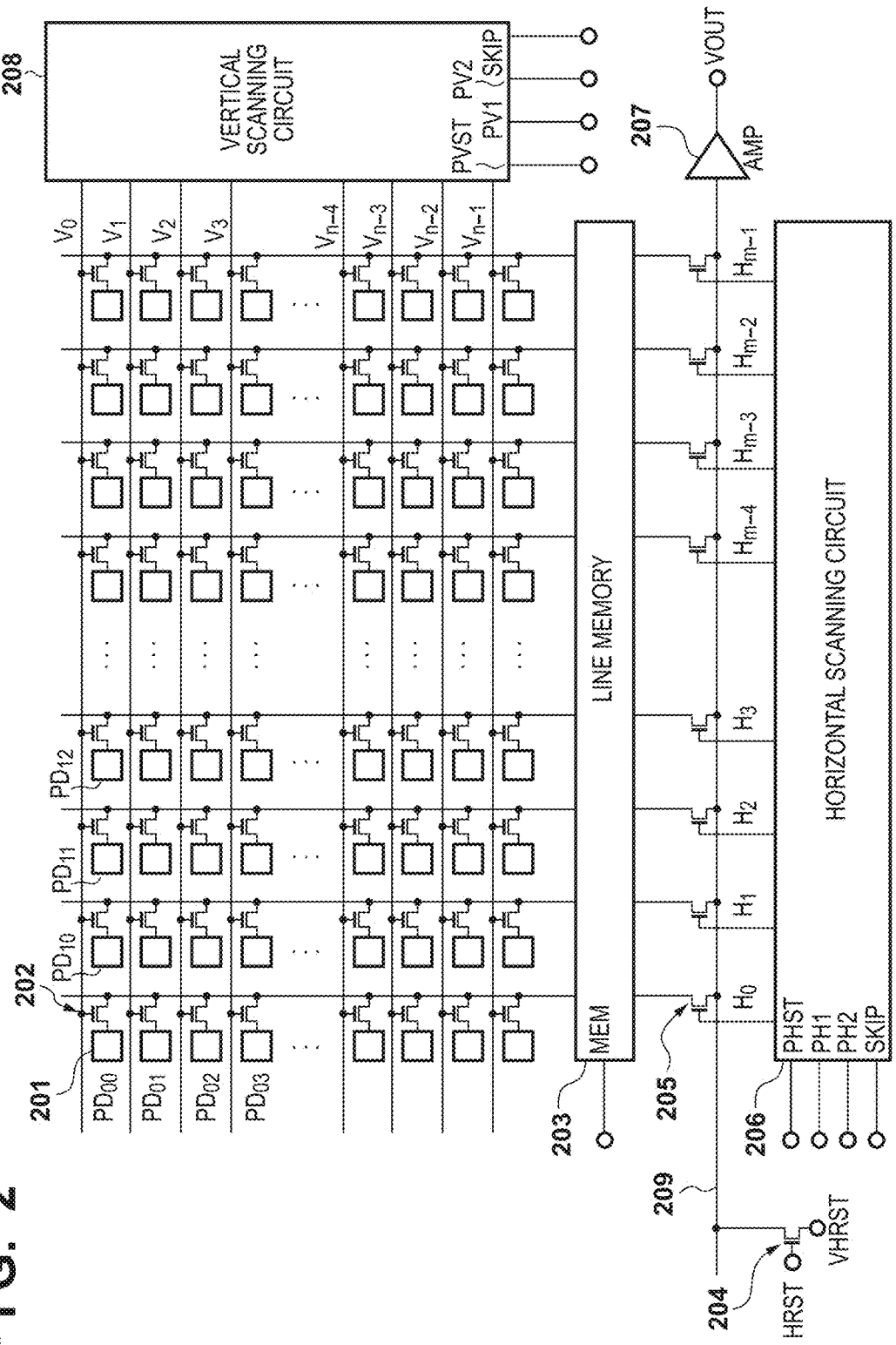
FIG. 2 is a block diagram showing an exemplary configuration of an image sensor in FIG. 1.

FIG. 2 is a block diagram showing an exemplary configuration of the image sensor 107. Note that FIG. 2 shows a minimum configuration necessary for illustrating a readout operation, and omits a configuration related to pixel reset and the like. Photoelectric conversion units 201 are each constituted by a photodiode, a pixel amplifier, a reset switch, and the like. Hereinafter, the photoelectric conversion units 201 will be referred to as PDmn. Here, m denotes an address in the X direction, where m=0, 1, . . . , m−1, and n denotes an address in the Y direction, where n=0, 1, . . . , n−1. In the image sensor 107, m photoelectric conversion units 201 in the horizontal (X) direction and n photoelectric conversion units 201 in the vertical (Y) direction, i.e., a total of m×n photoelectric conversion units 201 are two-dimensionally arranged, whereas reference numerals are given only in the vicinity of an upper left photoelectric conversion unit PD00 for the sake of simplification of the drawing.

A switch 202 is controlled by a vertical scanning circuit 208, and output of the photoelectric conversion units PDmn is selected row by row.

A line memory 203 is usually constituted by a capacitor, and temporarily stores output of the photoelectric conversion units for one row selected by the vertical scanning circuit 208.

A switch 204 resets a horizontal output line 209 to a prescribed potential VHRST in accordance with the control of a signal HRST.

Switches 205 (H0 to Hm−1) are connected to the line memory 203 and the horizontal output line. By the horizontal scanning circuit 206 sequentially turning on the switches 205, the row-by-row output of the photoelectric conversion units PDmn stored in the line memory 203 is read out to the horizontal output line 209, and is output as a signal VOUT via an output amplifier 207.

A signal PHST that is input to the horizontal scanning circuit 206 is data input of the horizontal scanning circuit, and PH1 and PH2 are shift clock input. Data is set with PH1=H, and the data is latched with PH2. It is possible to sequentially shift PHST and sequentially turn on the switches 205 (H0 to Hm−1) by inputting shift clocks as PH1 and PH2. A signal SKIP is control input for causing settings to be configured at the time of thinning-out read. Scan of the switches 205 is skipped at prescribed intervals by setting the signal SKIP at an H level, and thinning-out read is performed row by row.

The vertical scanning circuit 208 can selectively turn on and off the switch 202 of each photoelectric conversion unit PDmn by sequentially outputting control signals V0 to Vn−1. The control signals V0 to Vn−1 are controlled by data input PVST, shift clocks PV1 and PV2, and the thinning-out read setting signal SKIP, as in the horizontal scanning circuit 206. Operations of the vertical scanning circuit 208 are similar to those of the horizontal scanning circuit 206, and therefore a detailed description thereof will be omitted.

Pixel Structure

FIGS. 3A to 5B are diagrams showing exemplary structures of image capture pixels and focus detection pixels. The image sensor 107 in the present embodiment employs pixel arrangement of a Bayer pattern in which four pixels in two rows×two columns are deemed to be one unit, pixels having G (green) spectral sensitivity are arranged as diagonal two pixels, and a pixel having R (red) spectral sensitivity and a pixel having B (blue) spectral sensitivity are arranged as the other two pixels. Some pixels in this Bayer pattern pixel group are the focus detection pixels. Accordingly, the image sensor 107 in the present embodiment can acquire an image signal to be used in focus detection of the phase-difference detection type. The focus detection pixels are discretely arranged.

Figure 3B:
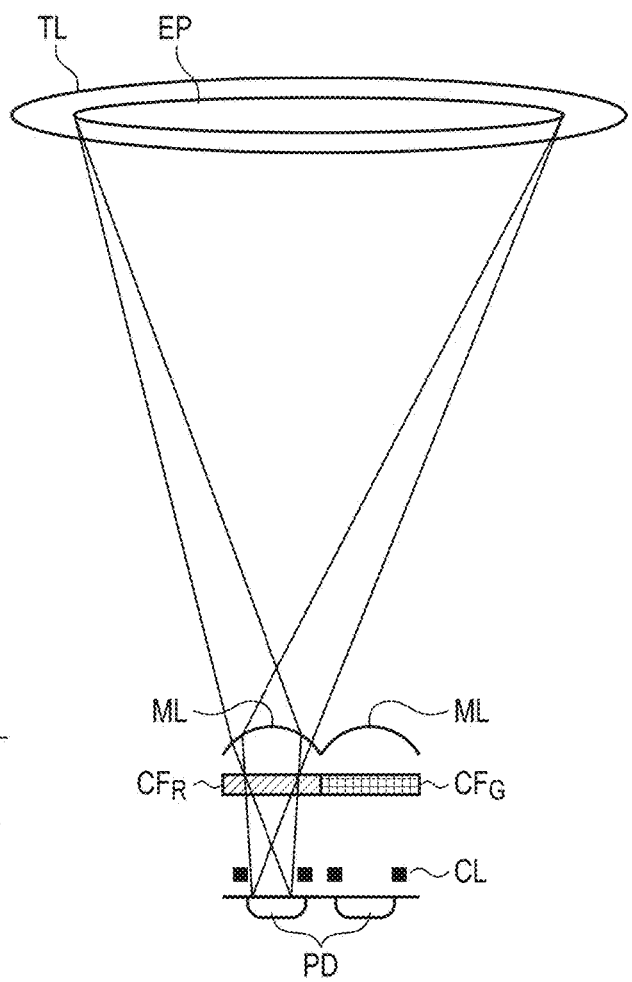
FIGS. 3A and 3B are diagrams showing exemplary arrangement and structure of image capture pixels in the image sensor in an embodiment.
Figure 3A:
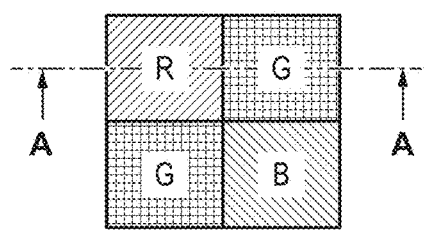

FIG. 3A is a plan view of two rows×two columns of the image capture pixels. As mentioned above, in the Bayer pattern, two G pixels are arranged in a diagonal direction, and an R pixel and a B pixel are arranged as the other two pixels. This arrangement of two rows×two columns is repeated over the entire image sensor 107.

FIG. 3B is a diagram showing an A-A cross-section of FIG. 3A and optical paths from the imaging optical system.

ML denotes an on-chip microlens arranged in the front surface of each pixel, CFR denotes an R (red) color filter, and CFG denotes a G (green) color filter. PD is a schematic diagram showing the photoelectric conversion units 201 of the pixels, and CL denotes an interconnect layer for forming a signal line that transmits various signals within the image sensor 107. TL is a schematic diagram showing the imaging optical system.

Here, the on-chip microlens ML and the photoelectric conversion unit PD in the image capture pixel are configured such that a light beam which has passed through the imaging optical system TL is subjected to photoelectric conversion as effectively as possible. In other words, an exit pupil EP of the imaging optical system TL and the photoelectric conversion unit PD are in a conjugate relationship through the microlens ML, and the effective area of the photoelectric conversion unit PD is designed so as to be large. Although FIG. 3B shows light beams incident on the R pixel, the G pixel and the B (blue) pixel also have the same structure. Accordingly, the exit pupil EP corresponding to each of the RGB image capture pixels has a large diameter, and improves the S/N ratio of the image signals as a result of efficiently taking in light beams from the object.

Figure 4B:
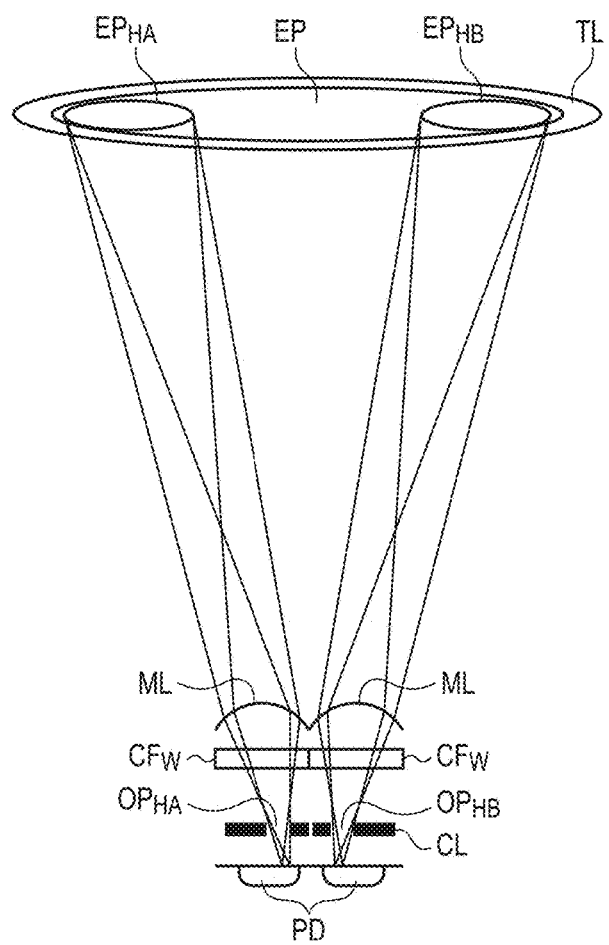
FIGS. 4A and 4B are diagrams showing exemplary arrangement and structure of focus detection pixels that are provided in the image sensor in an embodiment for performing pupil division in a horizontal direction (lateral direction) of a lens.
Figure 4A:
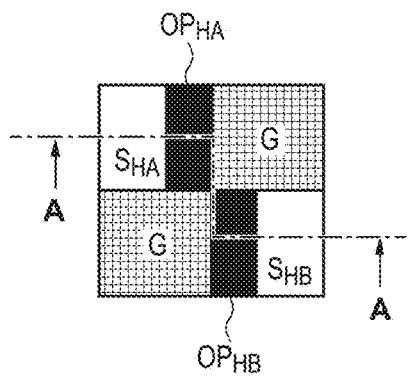

FIGS. 4A and 4B show exemplary arrangement and structure of the focus detection pixels for performing pupil division in the horizontal direction (lateral direction) of the imaging optical system in the present embodiment. Here, the horizontal direction (lateral direction) indicates the longitudinal direction of the image sensor, for example.

FIG. 4A is a plan view of pixels in two rows×two columns including a focus detection pixel pair. When obtaining an image signal for recording or display, a main component of luminance information is acquired using the G pixel. Since a human is sensitive to luminance information due to image recognition characteristics thereof, deterioration in image quality is likely to be perceived if the G pixel is defective. On the other hand, pixels of colors other than green, namely the R pixel and the B pixel are pixels that acquire color information (color difference information), and since a human is insensitive to color information due to image recognition characteristics thereof, deterioration in image quality is unlikely to be perceived even if some defect occurs in the pixels for acquiring the color information. In the present embodiment, among the pixels in two rows×two columns, the G pixels are left as the image capture pixels, and a focus detection pixel pair, namely SHA and SHB are arranged at the positions of the R pixel and the B pixel.

FIG. 4B is a diagram showing an A-A cross-section of FIG. 4A (i.e., a cross-section of the focus detection pixel pair) and optical paths from the imaging optical system.

The microlens ML and the photoelectric conversion unit PD have the same structure as those of the image capture pixel shown in FIG. 3B. In the present embodiment, since a signal of the focus detection pixel is not used as an image signal, a colorless transparent filter CFW (White) is arranged in place of a color filter for color separation. Furthermore, in order to perform pupil division in each pixel, an opening portion of the interconnect layer CL is decentered in one direction with respect to the center line of the microlens ML. That is to say, the openings of the focus detection pixel SHA and the focus detection pixel SHB that constitute the focus detection pixel pair are decentered in different directions.

Specifically, since an opening portion OPHA of the focus detection pixel SHA is decentered to the right side, the focus detection pixel SHA receives a light beam that has passed through an exit pupil EPHA located on the left side of the imaging optical system TL. Similarly, since an opening portion OPHB of the focus detection pixel SHB is decentered to the left side, the focus detection pixel SHB receives a light beam that has passed through an exit pupil EPHB located on the right side of the imaging optical system TL. Luminance signals acquired by a plurality of focus detection pixels SHA regularly arranged in the horizontal direction are each assumed to be an image A signal (first image signal). Also, luminance signals acquired by a plurality of focus detection pixels SHB regularly arranged in the horizontal direction are each assumed to be an image B signal (second image signal). A defocus amount of an object image having a luminance distribution in the horizontal direction can be computed by detecting relative positions of these image A signal and image B signal and multiplying an image positional difference by a conversion coefficient.

Figure 5A:
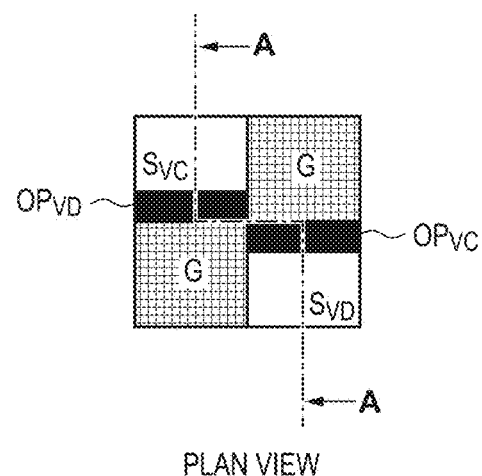
FIGS. 5A and 5B are diagrams showing exemplary arrangement and structure of focus detection pixels that are provided in the image sensor in an embodiment for performing pupil division in a vertical direction (perpendicular direction) of the lens.
Figure 5B:
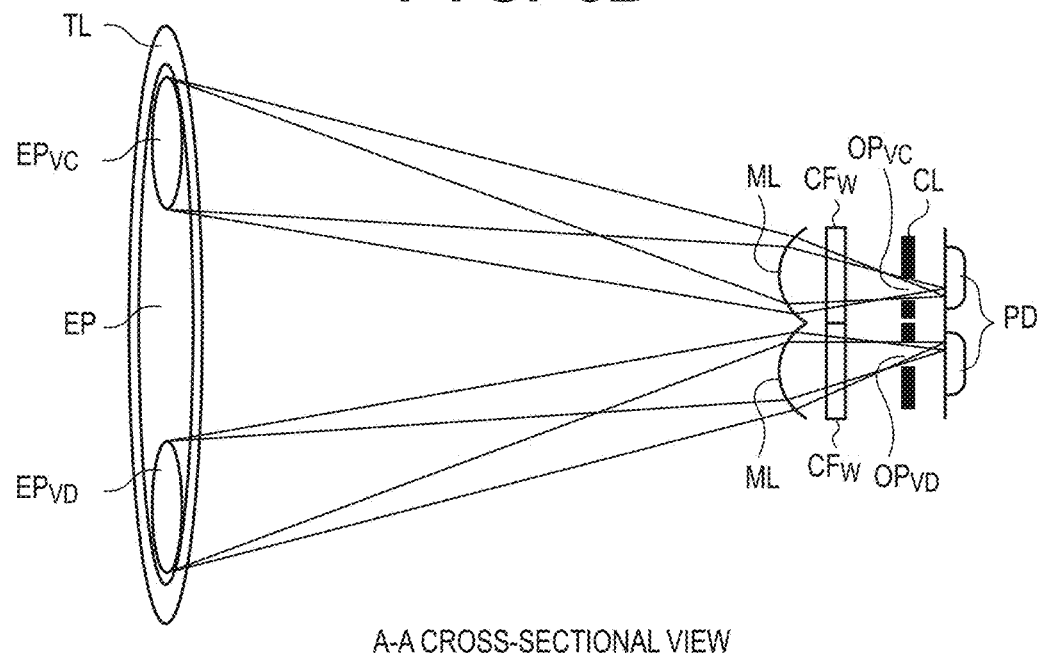

FIGS. 5A and 5B show exemplary arrangement and structure of the focus detection pixels for performing pupil division in the vertical direction (perpendicular direction) of the imaging optical system in the present embodiment. The vertical direction (perpendicular direction) is a direction perpendicular to the longitudinal direction or the horizontal direction (lateral direction) of the image sensor, for example.

FIG. 5A is a plan view of pixels in two rows×two columns including the focus detection pixels, and as in FIG. 4A, the G pixels are left as the image capture pixels, and a focus detection pixel pair, namely SVC and SVD are arranged at the positions of the R and B pixels.

FIG. 5B is a diagram showing an A-A cross-section of FIG. 5A (i.e., a cross-section of the focus detection pixel pair) and optical paths from the imaging optical system.

As is found from comparison with FIG. 4B, the pixels in FIG. 5B have a common structure of the focus detection pixels except that the pupil division direction is the perpendicular direction. That is to say, since an opening portion OPVC of the focus detection pixel SVC is biased to the vertically lower side, the focus detection pixel SVC receives a light beam that has passed through an exit pupil EPVC located on the upper side of a lens TL. Similarly, since an opening portion OPVD of the focus detection pixel SVD is biased to the vertically upper side, the focus detection pixel SVD receives a light beam that has passed through an exit pupil EPVD located on the lower side of the lens TL.

Object images acquired by a plurality of focus detection pixels SVC regularly arranged in the vertical direction are each assumed to be an image signal C. Also, object images acquired by a plurality of focus detection pixels SVD regularly arranged in the vertical direction are each assumed to be an image signal D. A defocus amount of an object image having a luminance distribution in the vertical direction can be detected by detecting relative positions of these image signal C and image signal D and multiplying an image positional difference by a conversion coefficient.

Next, a description will be given of a method for obtaining the conversion coefficient for computing the defocus amount from the image positional difference. The conversion coefficient can be computed based on aperture information of the imaging optical system and a sensitivity distribution of each focus detection pixel. FIGS. 6A to 7B each schematically show a state where a light beam, which is restricted by some constituent members of the imaging optical system TL such as lens holding frames and the diaphragm 102, is incident on the image sensor 107.

Figure 6A:
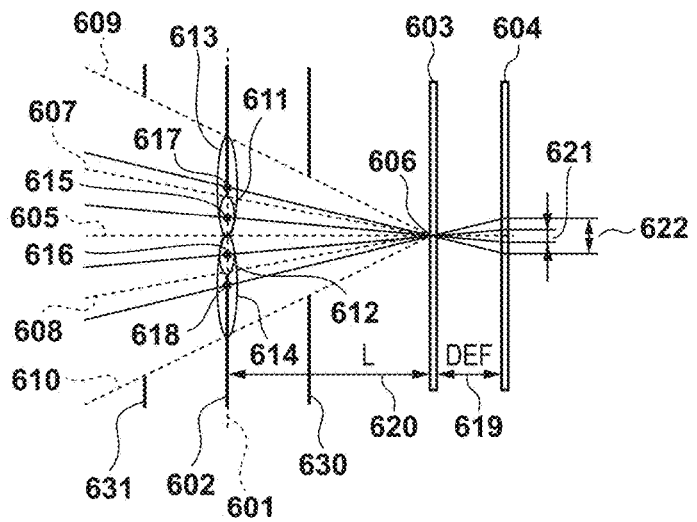
FIGS. 6A and 6B are diagrams schematically showing a state where light beams incident on a pixel near the center of the image sensor are restricted by a diaphragm in an imaging optical system that is located at a position of an exit pupil plane.
Figure 6B:
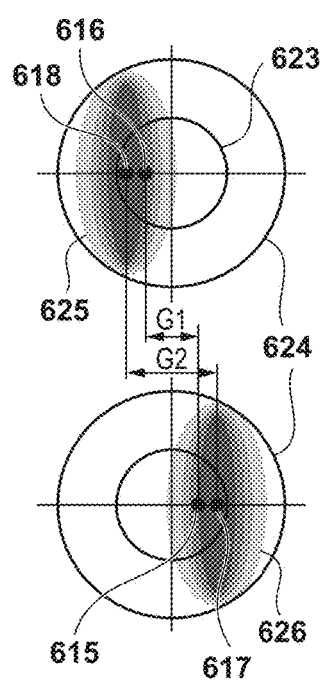

FIGS. 6A and 6B schematically show a state where light beams incident on a pixel near the center of the image sensor are restricted by the diaphragm 602 in the imaging optical system that is located at the position of an exit pupil plane 601. In FIG. 6A, 603 and 604 denote the position of the image sensor, and 603 denotes an expected image forming plane position. 605 denotes the optical axis, 606 denotes the optical axis position on the image sensor, 607 and 608 denote an area of an incident light beam in the case where the light beam is restricted by the diaphragm 602, and 609 and 610 denote an area of an incident beam in the case where the light beam is not restricted by the diaphragm 602. 611 and 612 denote focus detection light beams with respect to the area 607 to 608, and 615 and 616 denote the centroid positions of the focus detection light beams. Similarly, 613 and 614 denote focus detection light beams with respect to the area 609 to 610, and 617 and 618 denote centroid positions of the focus detection light beams. 630 denotes a lens holding frame located on the side closest to the image sensor, and 631 denotes a lens holding frame on the side closest to the object.

FIG. 6B is a diagram showing a change of the centroid positions of the restricted light beams that are incident on the focus detection pixels at the center of the image sensor from the exit pupil plane 601. 624 denotes a pupil region corresponding to the area 609 to 610 of a light beam incident on a pixel at the center of the image sensor in the case where the light beam is not restricted by the diaphragm 602. 623 denotes a pupil region corresponding to the area 607 to 608 of a light beam incident on a pixel at the center of the image sensor in the case where the light beam is restricted by the diaphragm 602. In FIG. 6A, 621 denotes an area corresponding to the pupil region 623, and 622 denotes an area corresponding to the pupil region 624 at a position 604 of the image sensor.

625 and 626 denote incident angle characteristics (sensitivity distributions) of the focus detection pixels SHA and SHB, respectively. Light beams that have been transmitted through the pupil regions 623 and 624 are incident on the focus detection pixels SHA and SHB with the sensitivity distributions 625 and 626. FIG. 6B shows centroid positions 615 and 616 of the focus detection light beams that are incident after being transmitted through the pupil region 623, and centroid positions 617 and 618 of the focus detection light beams that are incident after being transmitted through the pupil region 624. By obtaining these centroid positions, it is possible to obtain centroid intervals in the case where the light beams to be used in focus detection are limited and in the case where these light beams are not limited. The conversion coefficient for computing the defocus amount from the image positional difference can be obtained by storing in advance information of these sensitivity distributions of the focus detection pixels and the aperture information of the imaging optical system.

In FIG. 6A, a defocus amount 619 is represented as DEF, and a distance 620 from an image sensor position 603 to the exit pupil plane 601 is represented as L. Also, centroid intervals in the case where the light beams used in focus detection are restricted and in the case where these light beams are not restricted are represented as G1 (distance between 615 and 616) and G2 (distance between 617 and 618), respectively. Furthermore, assuming that an image positional difference in the case of the pupil region 623 is represented as PRED1 621, an image positional difference in the case of the pupil region 624 is represented as PRED2 622, and the conversion coefficients for converting the respective image positional differences into the defocus amount are represented as K1 and K2, the defocus amount can be obtained by the following equation.

$$DEF = K1 \times PRED1 = K2 \times PRED2$$

The conversion coefficients K1 and K2 for converting the image positional differences into the defocus amount can be obtained by the following equations.

$$K1 = G1/L$$

$$K2 = G2/L$$

In the case where a focus detection position (AF frame) does not exist near the optical axis, vignetting (restriction) of a focus detection light beam is generated due to an exit pupil of a diaphragm located at a position out of the exit pupil plane 601, or an exit pupil corresponding to a lens holding frame other than the diaphragm of the imaging optical system even when the F-number is smaller than the value corresponding to the exit pupil of the diaphragm.

Figure 7A:
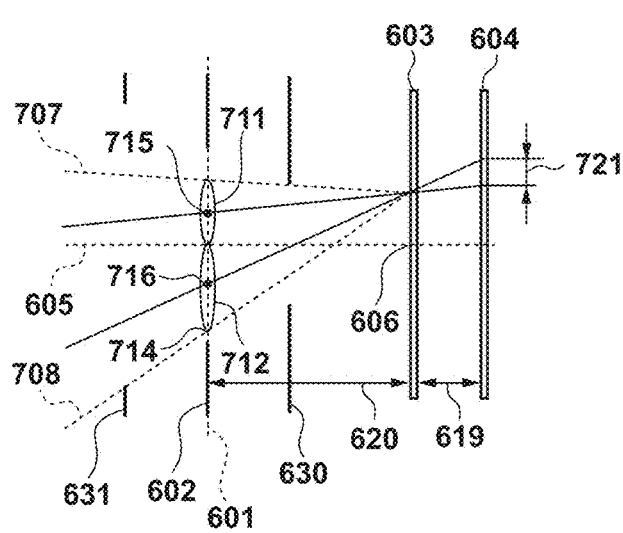
FIGS. 7A and 7B are diagrams schematically showing a state where light beams incident on a pixel having an image height in the image sensor are restricted by the diaphragm in the imaging optical system that is located at the position of the exit pupil plane.
Figure 7B:
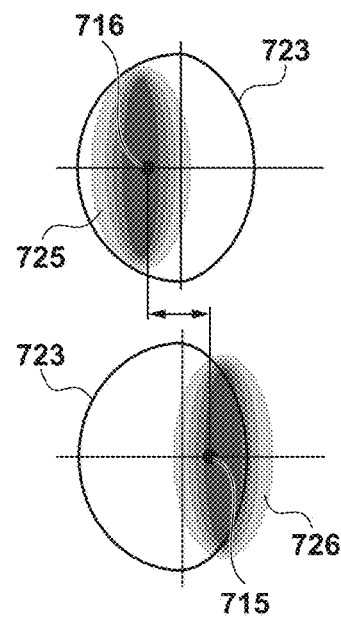

FIGS. 7A and 7B show a state where light beams are limited by a lens holding frame with respect to an image capture pixel located at a position separate from the center (which is assumed to be a position corresponding to the optical axis) of the image sensor. In FIG. 7A, the same elements as those in FIG. 6A are given the same reference numerals. 707 and 708 denote an area of a light beam incident in the case where the light beam is restricted by a lens holding frame 630 located on the side closest to the image sensor and a lens holding frame 631 located on the side closest to the object. 711 and 712 denote focus detection light beams with respect to the area 707 to 708, and 715 and 716 denote centroid positions of the focus detection light beams.

FIG. 7B is a diagram showing centroid positions of restricted light beams that are incident from the exit pupil plane 601 on the focus detection pixels at positions having an image height from the center of the image sensor. 723 denotes a pupil region corresponding to the area 707 to 708 of the restricted light beams that are incident on a pixel having an image height from the center of the image sensor. 725 and 726 denote incident angle characteristics (sensitivity distributions) of the focus detection pixels SHA and SHB, respectively. Light beams that have transmitted through the pupil region 723 are incident on the focus detection pixels SHA and SHB with the sensitivity distributions 725 and 726. For this reason, a centroid interval in the case where the light beams to be used in focus detection are limited by the lens holding frames can be obtained by obtaining distribution centroids 715 and 716 of the focus detection light beams that have transmitted through the pupil region 723. The conversion coefficient for computing the defocus amount from the image positional difference can be obtained by storing in advance sensitivity distribution information of the focus detection pixels and aperture information of the imaging optical system.

In FIG. 7A, a defocus amount 619 is represented as DEF, and a distance 620 from an image sensor position 603 to the exit pupil plane 601 is represented as L. Also, a centroid interval in the case where the focus detection light beams are restricted by the lens holding frames 630 and 631 is represented as G3 (distance between 715 and 716), the image positional difference is represented as PRED3 721, and the conversion coefficient for converting the image positional difference into the defocus amount is represented as K3. In this case, the defocus amount can be obtained by the following equation.

$$DEF = K3 \times PRED3$$

The conversion coefficient K3 for converting the image positional difference into the defocus amount can be obtained by the following equation.

$$K3 = G3/L$$

Here, a state has been described where the focus detection light beams are restricted by the lens holding frames depending on the position of the focus detection region on the image sensor. However, in addition, the position on the image sensor where the light beams are restricted also changes depending on a magnification change operation with a reciprocally moving operation of the lens groups 101, 102, and 103, and a position change of the focusing lens 105. The coefficient for converting the image positional difference into the defocus amount changes with a change of the position on the image sensor where the light beams are restricted.

Figure 8:
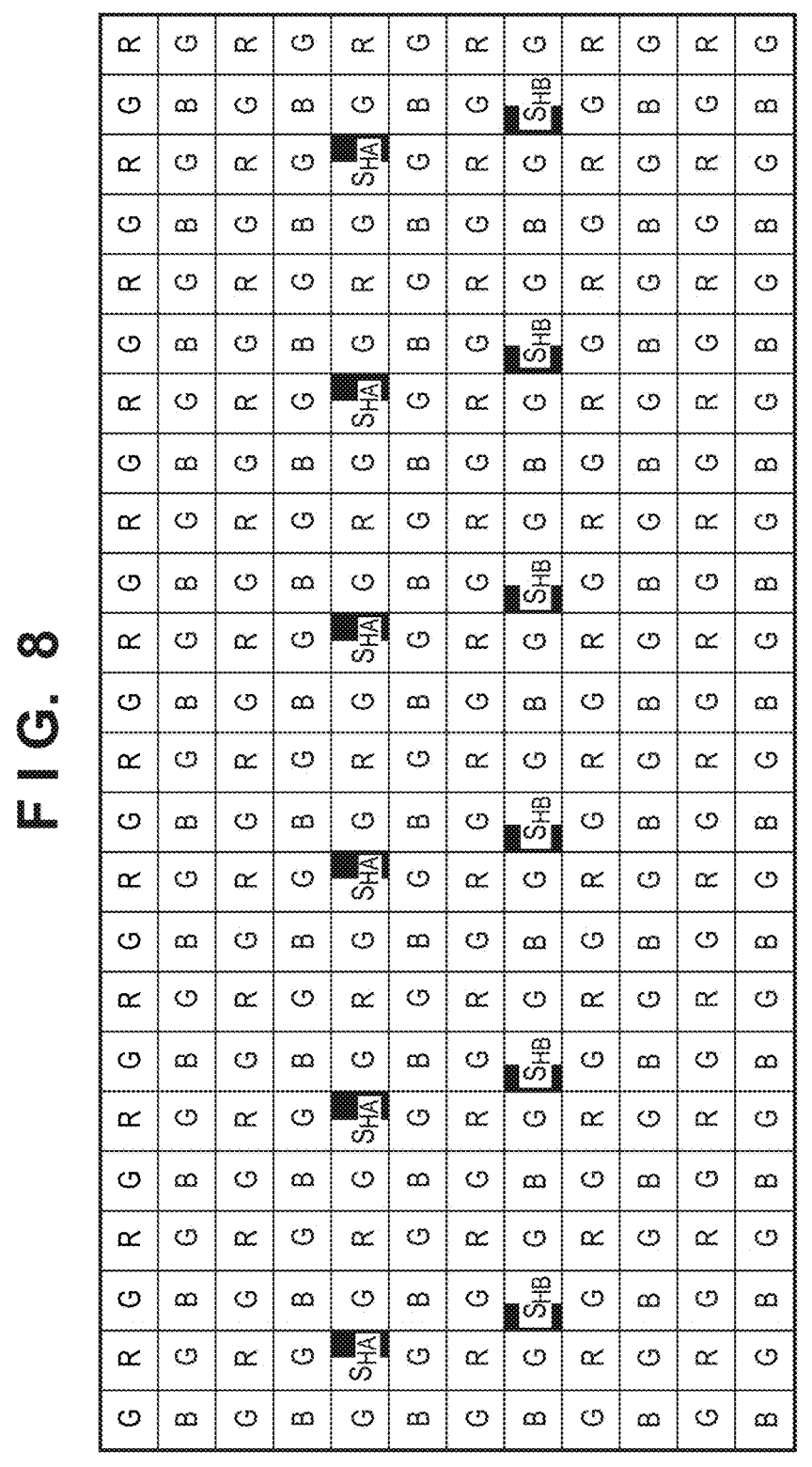

FIG. 8 is a diagram showing exemplary arrangement of the image capture pixels and the focus detection pixels, and shows a part of the pixel group that the image sensor 107 has. In FIG. 8, G denotes a pixel having a green filter, R denotes a pixel having a red filter, and B denotes a pixel having a blue filter. SHA and SHB in FIG. 8 denote a focus detection pixel group for detecting an image positional difference in the horizontal direction that has been described using FIGS. 4A and 4B. In FIG. 8, black portions of SHA and SHB each indicate the biased opening position of a pixel. Although FIG. 8 shows an example in which only the focus detection pixel group for detecting the image positional difference in the horizontal direction are arranged, it should be noted that the focus detection pixel group for detecting an image positional difference in the vertical direction described using FIGS. 5A and 5B may further be or alternatively be arranged.

Figure 9:
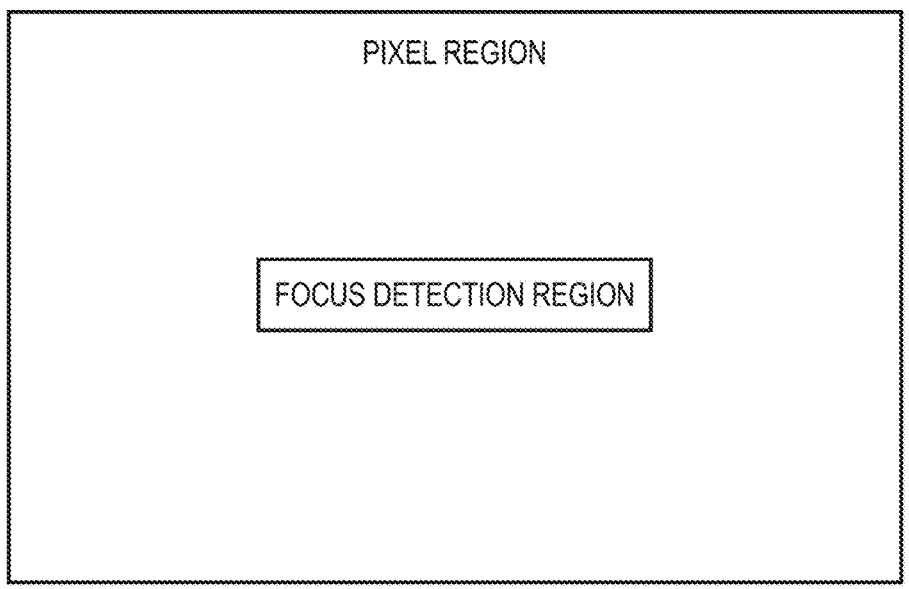
FIG. 9 is a diagram showing an exemplary position of a focus detection region that is set in an embodiment.

FIG. 9 shows an exemplary position of the focus detection region in the pixel region of the image sensor. The pixel arrangement within the focus detection region is as shown in FIG. 8. Although one focus detection region is set at the center of the pixel region in the present embodiment, a configuration may be employed in which a plurality of focus detection regions are arranged and image signals are generated by the focus detection pixels from an object image formed in each of the focus detection regions. Note that the focus detection region may be set as a region within a captured image screen.

Operations in this camera 100 will be described with reference to flowcharts in FIGS. 10 to 12.

Figure 10:
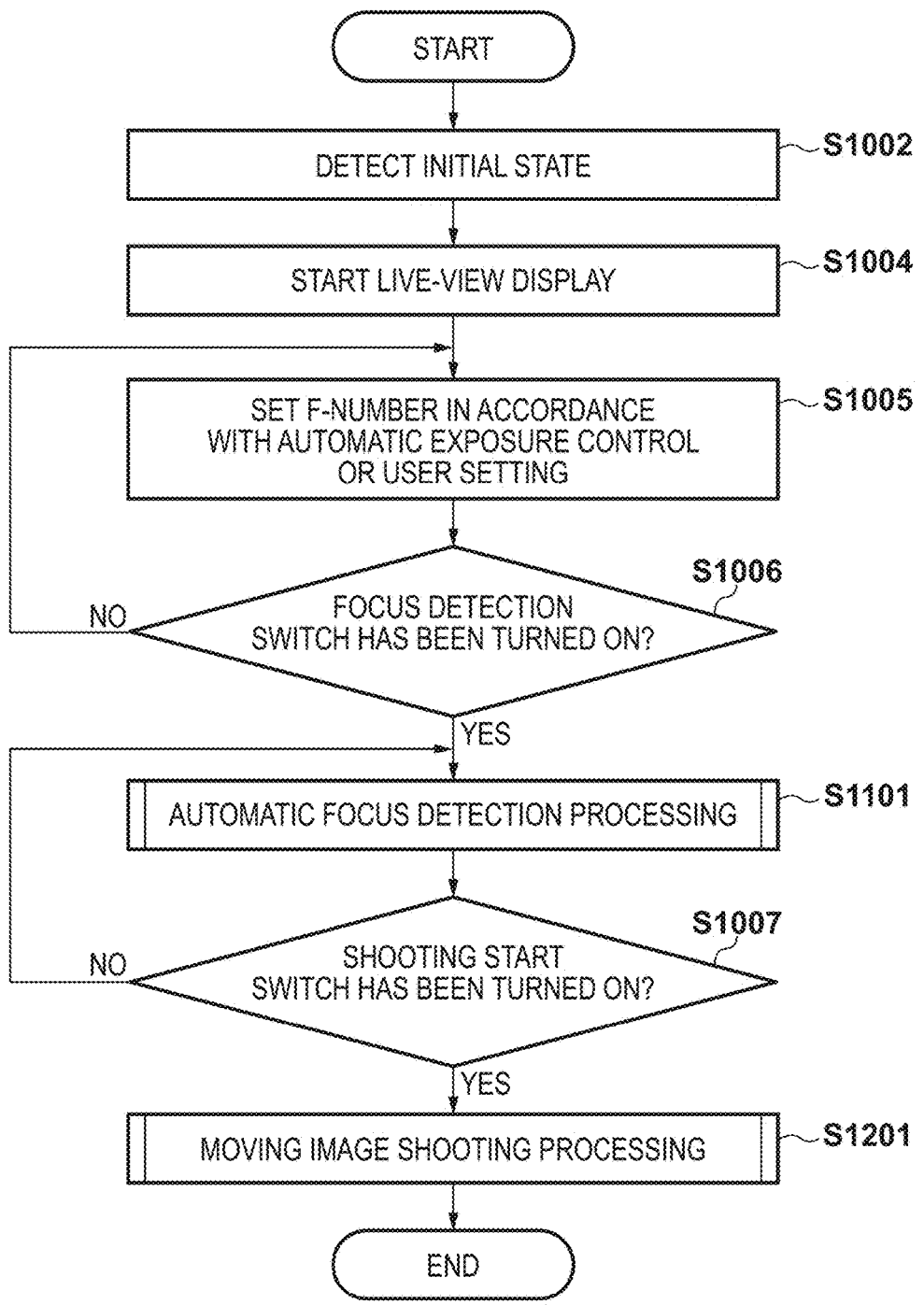
FIG. 10 is a flowchart showing overall operations of the camera in an embodiment.

FIG. 10 is a flowchart showing operations of the camera 100 in the case where the power has been turned on and a moving image is to be shot. For example, the operations in FIG. 10 are started upon a user turning on the power switch in the operation switch group 132.

In step S1002, the CPU 121 executes initialization operations such as a check of operations of the actuators 111, 112, and 114 and the image sensor 107 in the camera 100 and initialization of the memory and an execution program. The CPU 121 also executes a shooting preparation operation.

In step S1004, the CPU 121 causes the image sensor 107 to start a cyclic shooting operation (moving image shooting operation). Then, the CPU 121 sequentially performs readout of an image signal obtained by the shooting, generation of image data, and display thereof on the display device 131, and thereby starts live-view display on the display device 131.

In step S1005, the CPU 121 sets (updates) the f-number in the shooting for the live-view display. In the case where automatic exposure control (AE) is set, the CPU 121 determines the f-number so as to achieve proper exposure in accordance with luminance information obtained from the image signal read out from the image sensor 107, and changes the setting if the determined f-number is different from the current value. In the case where the f-number has been set by the user, this f-number is given priority. In the case of changing the setting of the f-number, the CPU 121 sends information of the new f-number to the shutter drive circuit 128, and drives the shutter actuator 112 at the time of shooting to change the opening diameter of the diaphragm to be achieved.

In step S1006, the CPU 121 determines whether or not a focus detection switch (AF switch) in the operation switch group 132 has been turned on, advances the processing to step S1005 if not, and advances the processing to a subroutine related to an automatic focus detection operation in step S1101 if turned on.

Figure 11A:
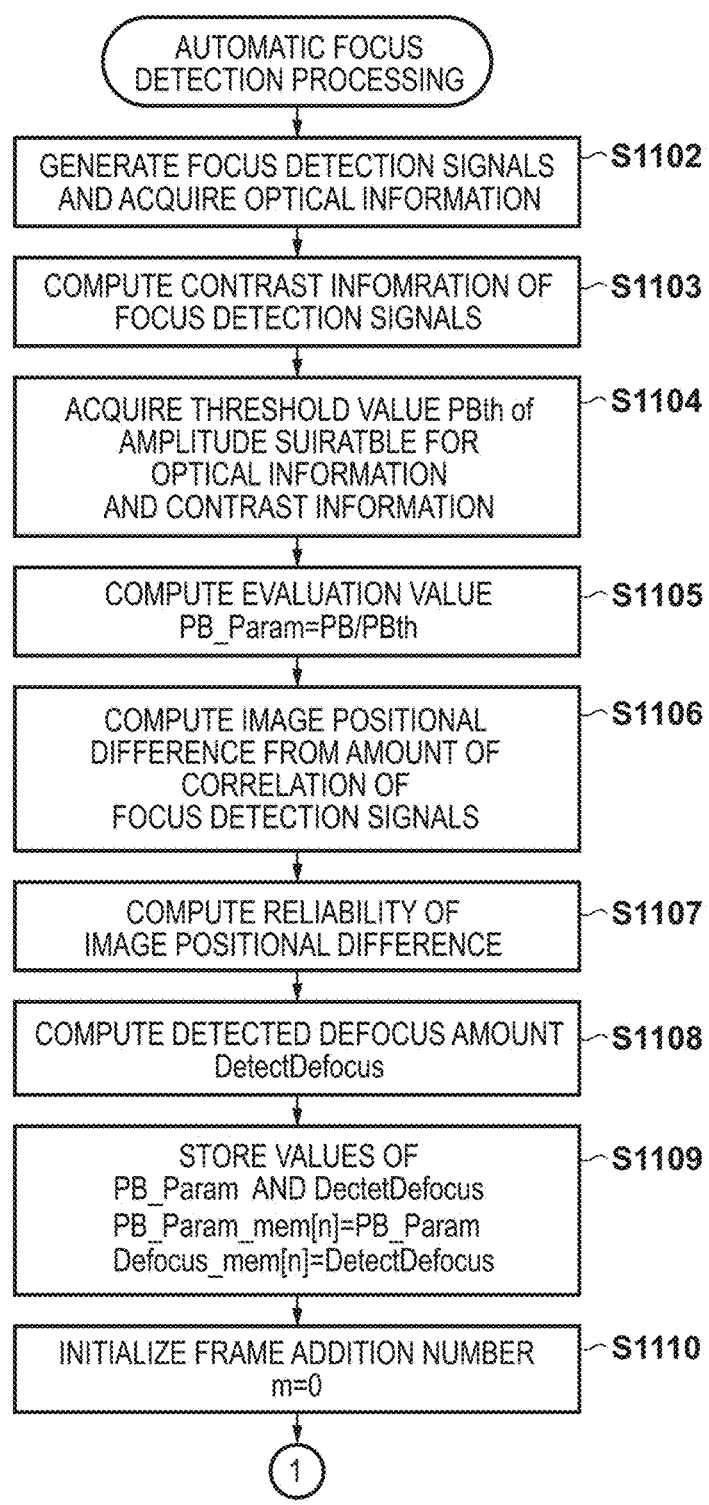
FIGS. 11A and 11B are flowcharts showing the details of automatic focus detection processing in an embodiment.

Here, the details of the automatic focus detection subroutine in step S1101 will be described using flowcharts shown in FIGS. 11A and B.

In step S1102, the CPU 121 acquires a signal of the focus detection pixel within the focus detection region in the current frame, generates the image A signal and the image B signal, and stores the generated signals in an internal memory. The CPU 121 also acquires predetermined optical information. Exemplary optical information may include:

the aperture of the imaging optical system (e.g., the f-number (or the opening diameter) and the aperture of the lens frame, or the projection aperture of the exit pupil on the imaging plane);

the focal length (angle of view) of the imaging optical system;

the focus distance (focusing lens position); and the image height of the focus detection region (e.g., the image height at the center of the focus detection region).

In subsequent step S1103, the CPU 121 reads out the image A signal and the image B signal from the internal memory, and computes contrast information. The contrast information may be an average value of contrast information of the image A signal and contrast information of the image B signal. The contrast information is information regarding the level of the image signal, and is amplitude PB (a difference between the largest value and the smallest value), the largest value, the smallest value, sharpness expressed as the following equations, or the like, for example.

$$\text{Sharpness\_sa} = \sum_{n=0}^{nmax-1} (S_{HA[n]} - S_{HA[n+1]})^2 \Big/ \sum_{n=0}^{nmax-1} |S_{HA[n]} - S_{HA[n+1]}| \quad (1)$$

$$\text{Sharpness\_sb} = \sum_{n=0}^{nmax-1} (S_{HB[n]} - S_{HB[n+1]})^2 \Big/ \sum_{n=0}^{nmax-1} |S_{HB[n]} - S_{HB[n+1]}| \quad (2)$$

$$\text{Sharpness} = (\text{Sharpness\_sa} - \text{Sharpness\_sb})/2 \quad (3)$$

Here, SHA[n] and SHB[n] (n=0, 1, 2, . . . , nmax) denote signal data of the focus detection pixels that constitutes the image A signal and the image B signal. Note that, in the following description, the amplitude PB is computed as the contrast information.

In step S1104, the CPU 121 acquires a threshold value of the contrast information (a threshold value PBth of the amplitude PB) necessary for the amount of variation of the detected defocus amount to be within a predetermined specified value. Here, the threshold value PBth of the amplitude PB can be acquired by referencing a value suitable for the optical information at the time of shooting of the current frame acquired in step S1102 and the contrast information computed in step S1103 in a threshold value table that is prepared in advance.

Note that the threshold value of the contrast information can be experimentally obtained for each combination of the optical information. For example, the contrast of the object is changed by shooting a specific pattern in various brightness environments, and the image A signal and the image B signal are acquired from the shot images to detect the defocus amount. Then, the threshold value can be obtained from the value of the contrast information with which an error in the detected defocus amount is within a certain depth. Note that this is merely an example, and the threshold value may be prepared by other methods.

Although the optical information is most accurate when considering various kinds of information mentioned above, it should be noted that at least the information regarding the aperture of the imaging optical system and the image height of the focus detection region need only be used. It is thereby possible to save the time and effort for preparing the threshold value and the storage capacity necessary for the table.

In step S1105, the CPU 121 computes an evaluation value PB_Param of the detected defocus amount by Equation (4) below.

$$PB\_Param = PB/PBth \quad (4)$$

Here, if the evaluation value PB_Param of Equation (4) is larger than or equal to a specified value (here, 1 or larger), the amount of variation of the detected defocus amount is within a specified value, and if the evaluation value PB_Param is smaller than the specified value (here, smaller than 1), it means that the amount of variation of the detected defocus amount is larger than the specified value.

Note that, as mentioned above, a similar evaluation value can be obtained (a corresponding threshold value is prepared) using a value other than the amplitude PB of a focus detection waveform as the contrast information.

In steps S1106 and S1107, the CPU 121 performs processing for calculating the amount of correlation between the focus detection signals (the image A signal and the image B signal) and determination of the reliability of the obtained amount of correlation.

In step S1106, the CPU 121 computes a relative positional difference between two images from the amount of correlation between the focus detection signals (the image A signal and the image B signal). Specifically, the CPU 121 computes the amount of correlation between the two image signals while relatively shifting one with respect to the other (here, the image A signal) in units of pixels.

Assuming that pixels constituting an image A waveform are a1 to an, and pixels constituting an image B waveform are b1 to bn (n denotes data number), the CPU 121 computes the amount of correlation Corr (l) in accordance with Equation (5) below.

$$\text{Corr}(l) = \sum_{k=1}^{n-l-1} |a_k - b_{k+l}| \qquad (5)$$

Figure 13:
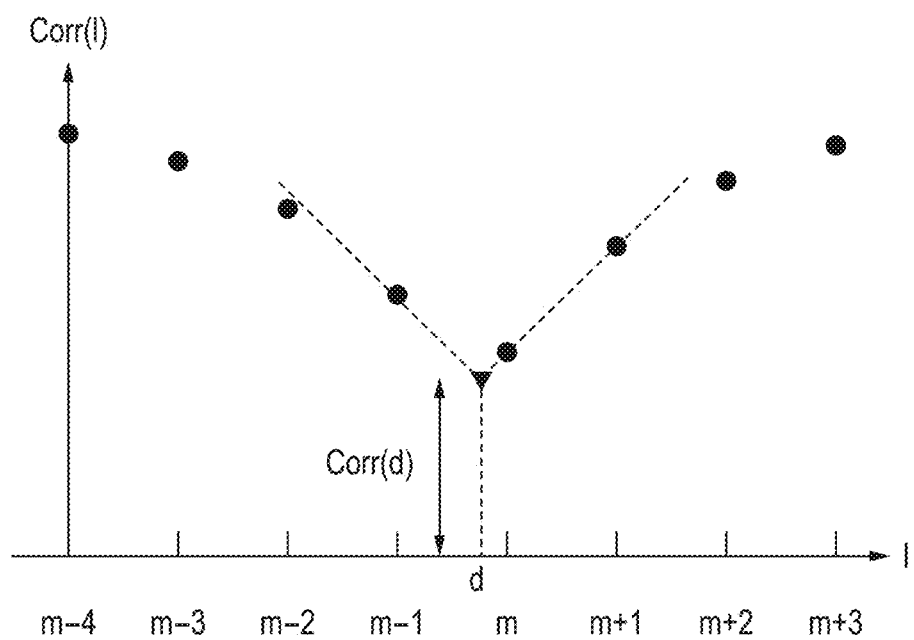
FIG. 13 is a schematic diagram for illustrating positional difference computation in an embodiment.

In Equation (5), l denotes a shift amount (integer) of the image B signal with respect to the image A signal, and the data number when shifting the image is limited to (n−1). The amount of correlation Corr (l) computed by Equation (5) is minimum when the correlation between the image A waveform and the image B waveform is highest, as shown in FIG. 13. The CPU 121 obtains a shift amount d with which the amount of correlation Corr (l) is smallest, in a unit smaller than a pixel by means of a three-point interpolation technique using a shift amount m (integer) with which the amount of correlation Corr (l) is minimum and the amount of correlation Corr (l) obtained with a shift amount near m.

In step S1107, the CPU 121 evaluates the reliability of the image positional difference (shift amount d) obtained in step S1106. In the case where the defocus amount is large, the image A waveform and the image B waveform are more asymmetric, (i.e., the degree of coincidence between the images lowers), and accordingly the amount of correlation CorrD is large. Conversely, the smaller the defocus amount is, the lower the amount of correlation CorrD is (i.e., the degree of coincidence between the images increases). Accordingly, if the amount of correlation CorrD corresponding to the image positional difference is smaller than or equal to the threshold value, it can be determined that the reliability is high.

In step S1108, the CPU 121 multiplies a post-correction image positional difference obtained in step S1106 by the defocus conversion coefficient suitable for the optical information at the time of shooting of the current frame, and thereby converts the image positional difference into the detected defocus amount DetectDefocus. The defocus conversion coefficient suitable for the optical information can be prepared in advance using a base line length with respect to the f-number, sensitivity distribution information of the focus detection pixels, and the like.

In step S1109, the CPU 121 stores the evaluation value PB_Param computed in step S1105 and the detected defocus amount DectetDefocus computed in step S1108 in the internal memory.

In step S1110 and subsequent steps, weighted addition control of the detected defocus amount is performed.

Figure 11B:
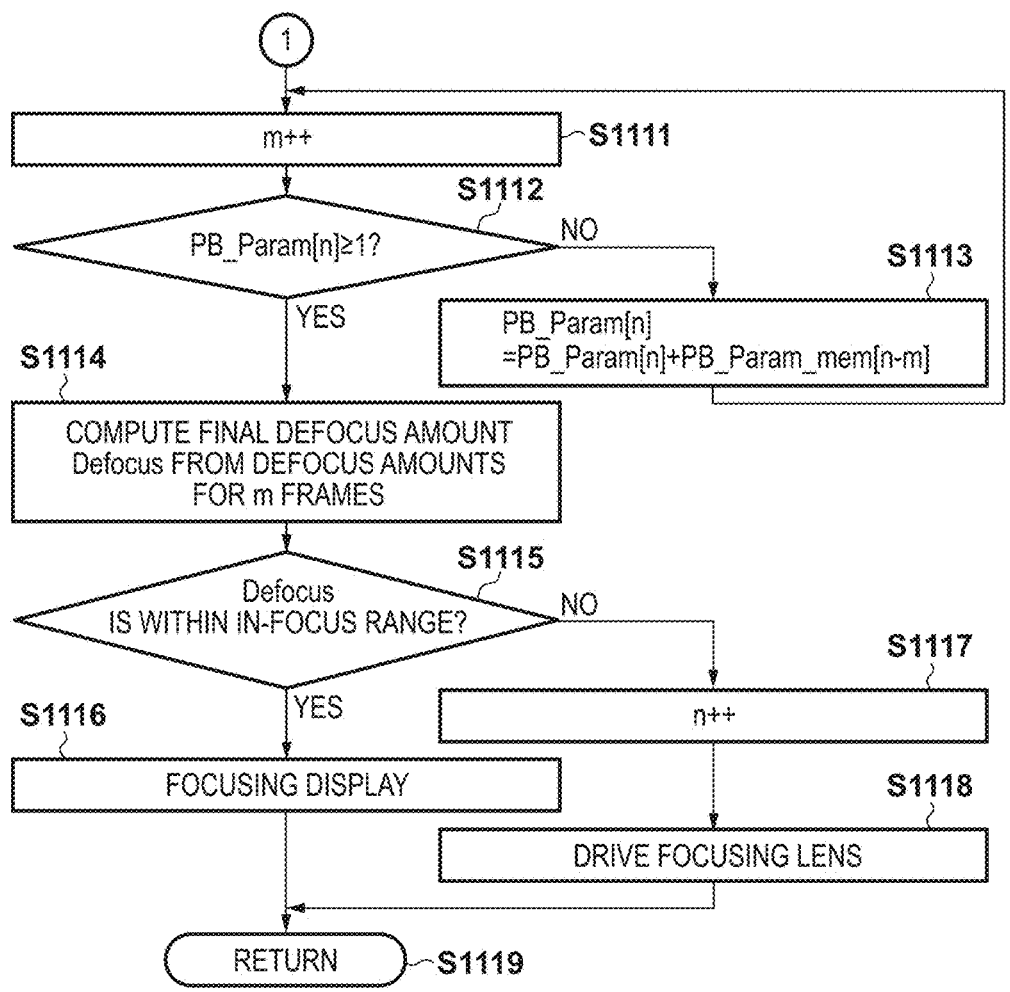

In step S1110, the CPU 121 first initializes a frame addition number m to 0, and thereafter, in step S1111 (FIG. 11B), the CPU 121 increments the frame addition number m. In subsequent step S1112, the CPU 121 determines whether or not the evaluation value PB_Param [n] computed in the current frame (i.e., computed at this time) is 1 or larger. If PB_Param [n] is smaller than 1, i.e., the amount of variation of the detected defocus amount is not within the specified value, the CPU 121 advances the processing to step S1113 (FIG. 11B).

In step S1113, the CPU 121 adds the value of an evaluation value PB_Param [n−m] computed in a past frame to the evaluation value PB_Param [n] to update the evaluation value PB_Param [n], and returns the processing to step S1111. The CPU 121 repeatedly executes steps S1111 to S1113 until the evaluation value PB_Param [n] becomes 1 or larger. Thus, it is determined based on the evaluation value whether or not to consider the defocus amount computed in the past, and the number of defocus amounts to be considered.

If it is determined in step S1112 that the evaluation value PB_Param [n] is 1 or larger, the CPU 121 advances the processing to step S1114, and performs weighted addition processing for the detected defocus amount in accordance with Equation (6) below from the defocus amounts for m frames. Here, m denotes the number of frames to be added.

$$\text{Defocus} = \frac{\sum_{m=0}^{k-1}(\text{Defocus}[n-m] \times PBparam[n-m])}{\sum_{m=0}^{k-1}(PBparam[n-m])} \qquad (6)$$

Note that the case where m=1 is the case of not considering the defocus amount computed in the past. The CPU 121 divides the total of the detected defocus amounts in respective frames to be considered for the defocus amount that are weighted using corresponding evaluation values by the total of the evaluation values, and thereby computes a final defocus amount Defocus.

Although the weighted addition using the corresponding evaluation values as weights is used here when obtaining the defocus amount from the detected defocus amounts in a plurality of frames, the defocus amount may be computed by other methods, such as by using an average value of the detected defocus amounts in a plurality of frames as the defocus amount.

In step S1115, the CPU 121 determines whether or not the defocus amount Defocus computed in step S1114 is within an in-focus range, and whether or not the absolute value of the defocus amount Defocus is within a specified value. If it is determined that the defocus amount Defocus is not within the in-focus range, the CPU 121 advances the processing to step S1117, increments the frame number n, and thereafter advances the processing to step S1118. In step S1118, the CPU 121 transmits the defocus amount Defocus to the focus drive circuit 126, drives the focus actuator 114 and drives the focusing lens 105 to perform focus adjustment, and ends the automatic focus detection processing.

On the other hand, if it is determined in step S1115 that the defocus amount Defocus is within the in-focus range, the CPU 121 advances the processing to step S1116, performs focusing display on the display device 131, and ends the processing.

Returning to FIG. 10, in step S1007, the CPU 121 determines whether or not a moving image shooting start switch included in the operation switch group 132 has been turned on, and if not, the CPU 121 returns the processing to step S1101 and performs the automatic focus detection processing for the next frame. On the other hand, if the moving image shooting start switch has been turned on, the CPU 121 advances the processing to step S1201, and performs moving image shooting processing.

The details of the moving image shooting processing in step S1201 will be described using a flowchart shown in FIG. 12.

In step S1202, the CPU 121 reads out image signals from the image sensor 107 through the image sensor drive circuit 124, and stores the read image signals in the internal memory. Next, the CPU 121 executes the above-described focus detection processing in step S1101.

In step S1203, the CPU 121 executes automatic exposure control (AE) processing based on luminance information in the current frame, for example, and determines shooting conditions (diaphragm, exposure time, sensitivity) for the next frame. In step S1204, the CPU 121 updates position information of the focusing lens 105 stored in the internal memory.

In step S1205, the CPU 121 interpolates a signal at the position of the focus detection pixel among the image signals read out from the image sensor 107 in step S1202, using signals of peripheral image capture pixels, and thereafter performs developing processing. In step S1206, the CPU 121 executes processing for recording a frame image after the developing processing. In the recording processing, compression coding processing or the like is also performed as necessary.

The CPU 121 advances the processing to step S1207, and determines whether or not an instruction to end the moving image recording has been given. For example, if the moving image shooting start switch included in the operation switch group 132 is pressed while recording the moving image, the CPU 121 deems it to be an instruction to end image recording, and ends the moving image recording processing. If the instruction to end the moving image recording has not been given, the CPU 121 returns the processing to step S1202, and executes shooting of the next frame and image readout.

Modification

In the above description, in steps S1111 to S1113, it is determined whether or not the addition value of the evaluation value PB_Param related to a plurality of successive frames is 1 or larger. However, the evaluation value PB_Param in a past frame with a low reliability of the positional difference computed in step S1107 may be excluded from the addition target. By doing so, the temporal continuity of the detected defocus amount to be subjected to the weighted addition may possibly be lost, but more accurate defocus amount detection is possible in a state where the movement of the focusing lens is stopped or small, for example.

Also, in the case of considering the detected defocus amounts in a plurality of frames, the detected defocus amounts that can be considered may be limited to the detected defocus amounts within a prescribed time period (within a prescribed frame number) from the current frame. This is because, if the detected defocus amount of a frame that is temporarily separate from the current frame is referenced, it may cause generation of an error in the defocus amount after the weighted addition processing in the case where the object or the focusing lens position is changing.

Thus, in the present embodiment, when performing focus detection of the phase-difference detection type using the signals of the focus detection pixels arranged in the image sensor, the evaluation value is computed that is based on the contrast information of the focus detection signals obtained in the current frame. Then, it is determined based on the evaluation value whether the detected defocus amounts in the past needs to be considered to compute the defocus amount, and the number of frames for which the detected defocus amounts are to be considered. For this reason, even in the case where variation of the detected defocus amounts that are based on the focus detection signals in the current frame is large, an accurate defocus amount can be obtained by computing the defocus amount using information of an appropriate number of frames.

Furthermore, in the case of using information for a plurality of frames as well, since the detected defocus amounts are used, the accuracy of the defocus amount does not lower even when the information of a frame with a different shooting condition is included. This is significantly different from the case where the accuracy of the defocus amount decreases when a frame with a different shooting condition is included in the case of detecting the defocus amount by adding the focus detection signals for a plurality of frames.

Other Embodiments

Embodiment of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment and/or that includes one or more circuits (e.g., application specific integrated circuit (ASIC)) for performing the functions of one or more of the above-described embodiment, and by a method performed by the computer of the system or apparatus by, for example, reading out and executing the computer executable instructions from the storage medium to perform the functions of one or more of the above-described embodiment and/or controlling the one or more circuits to perform the functions of one or more of the above-described embodiment. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-185703, filed on Sep. 11, 2014, which is hereby incorporated by reference herein in its entirety.

What is claimed is:

1. An image capture apparatus comprising:
an image sensor capable of acquiring an image signal to be used in focus detection of a phase-difference detection type;
a CPU that executes a program stored in a non-volatile memory, wherein the CPU, by executing the program, functions as:
a first computing unit that computes a defocus amount of an imaging optical system based on the image signal;
a second computing unit that computes an evaluation value that is based on contrast information of the image signal;
a determining unit that determines based on the evaluation value, whether or not to consider a defocus amount computed in the past; and
a third computing unit that computes a final defocus amount based on a plurality of defocus amounts including at least one defocus amount computed in the past if it is determined to consider the defocus amount computed in the past by the determining unit, or compute the final defocus amount based on a defocus amount that does not include any defocus amount computed in the past if it is determined not to consider the defocus amount computed in the past by the determining unit.

2. The image capture apparatus according to claim 1, wherein the contrast information is information regarding a level of the image signal.

3. The image capture apparatus according to claim 1, wherein the contrast information is one of amplitude, a largest value, a smallest value, and sharpness of the image signal.

4. The image capture apparatus according to claim 1, wherein the evaluation value indicates whether or not variation of a defocus amount is within a predetermined specified value.

5. The image capture apparatus according to claim 1, wherein the evaluation value is based on the contrast information and a threshold value that is determined in accordance with the contrast information and information of the imaging optical system.

6. The image capture apparatus according to claim 1, wherein the determining unit determines to consider the defocus amount computed in the past if the evaluation value is smaller than a specified value.

7. The image capture apparatus according to claim 6, wherein the determining unit determines the number of defocus amounts computed in the past that are to be used by the third computing unit such that a total of the evaluation value computed at the present time and one or more evaluation values of the image signal used in computation of the defocus amount computed in the past is larger than or equal to the specified value.

8. The image capture apparatus according to claim 1, wherein the first computing unit applies a conversion coefficient suitable for information of the imaging optical system at the time of acquiring the image signal to a positional difference of the image signal to compute the defocus amount.

9. The image capture apparatus according to claim 1, wherein the first computing unit computes the defocus amount based on a positional difference of the image signal, and
the CPU, by executing the program, also functions as an evaluating unit that determines reliability of the positional difference.

10. The image capture apparatus according to claim 9, wherein the third computing unit causes the plurality of defocus amounts not to include any defocus amount regarding which reliability of the positional difference of the image signal used in computation of the defocus amount has been determined to be low among the at least one defocus amount computed in the past.

11. The image capture apparatus according to claim 1, the CPU, by executing the program, also functions as an adjusting unit that performs focus adjustment of the imaging optical system in accordance with the final defocus amount.

12. A method for controlling an image capture apparatus including an image sensor capable of acquiring an image signal to be used in focus detection of a phase-difference detection type, the method comprising:
a first computing step of computing a defocus amount of an imaging optical system based on the image signal;
a second computing step of computing an evaluation value that is based on contrast information of the image signal;
a determining step of determining, based on the evaluation value, whether or not to consider a defocus amount computed in the past; and
a third computing step of computing a final defocus amount based on a plurality of defocus amounts including at least one defocus amount computed in the past if it is determined to consider the defocus amount computed in the past in the determining step, or computing the final defocus amount based on a defocus amount that does not include any defocus amount computed in the past if it is determined not to consider the defocus amount computed in the past in the determining step.

13. A non-transitory computer-readable storage medium storing a program for causing a computer provided in an image capture apparatus including an image sensor capable of acquiring an image signal to be used in focus detection of a phase-difference detection type to function as:
to compute a defocus amount of an imaging optical system based on the image signal;
to compute an evaluation value that is based on contrast information of the image signal;
to determine, based on the evaluation value, whether or not to consider a defocus amount computed in the past; and
to compute a final defocus amount based on a plurality of defocus amounts including at least one defocus amount computed in the past if it is determined to consider the defocus amount computed in the past, or compute the final defocus amount based on a defocus amount that does not include any defocus amount computed in the past if it is determined not to consider the defocus amount computed in the past.

* * * * *